United States Patent [19]

Burgess et al.

[11] 4,236,999
[45] Dec. 2, 1980

[54] SEPARATION OF SOLIDS FROM LIQUIDS BY SCREENING

[75] Inventors: George Burgess, Milford; Ernest W. Pitches, Orewa, both of New Zealand

[73] Assignee: Contra-Shear Holdings Limited, Auckland, New Zealand

[21] Appl. No.: 964,055

[22] Filed: Nov. 27, 1978

Related U.S. Application Data

[63] Continuation of Ser. No. 833,466, Sep. 12, 1977, abandoned.

[30] Foreign Application Priority Data

Sep. 17, 1976 [NZ] New Zealand ............... 182084

[51] Int. Cl.³ .................................. B07B 1/24
[52] U.S. Cl. ..................... 209/250; 209/270; 209/284; 209/294; 209/380; 210/403
[58] Field of Search ............ 209/250, 270, 284, 288, 209/293, 294, 296-298, 393, 406, 407, 411, 380, 243, 244, 254; 210/403, 402, 77

[56] References Cited

U.S. PATENT DOCUMENTS

| 801,442 | 10/1905 | Crossley | 209/407 |
| 1,531,482 | 3/1925 | Haug | 210/403 X |
| 1,717,604 | 6/1929 | Haug et al. | 210/403 X |
| 2,080,508 | 5/1937 | Sackett | 209/296 X |
| 2,664,204 | 12/1953 | Hurter | 210/403 |
| 3,145,164 | 8/1964 | Jonkman | 209/270 X |

Primary Examiner—Ralph J. Hill
Attorney, Agent, or Firm—Stevens, Davis, Miller & Mosher

[57] ABSTRACT

An apparatus for the separation of solids and liquids from a suspension has a hollow drum rotatably mounted about a horizontal axis. The drum wall is a screen made of a plurality of wires, preferably wedge-sectioned wires; spaced apart in a parallel arrangement and lying axially along the drum. Inlet means direct the suspension against the inner surface of the wall at an angle less than right angles, and preferably substantially tangentially to the inner surface, in a direction opposing the rotation of the drum. The separated solids remain within the drum and are extracted therefrom by suitable means.

29 Claims, 11 Drawing Figures

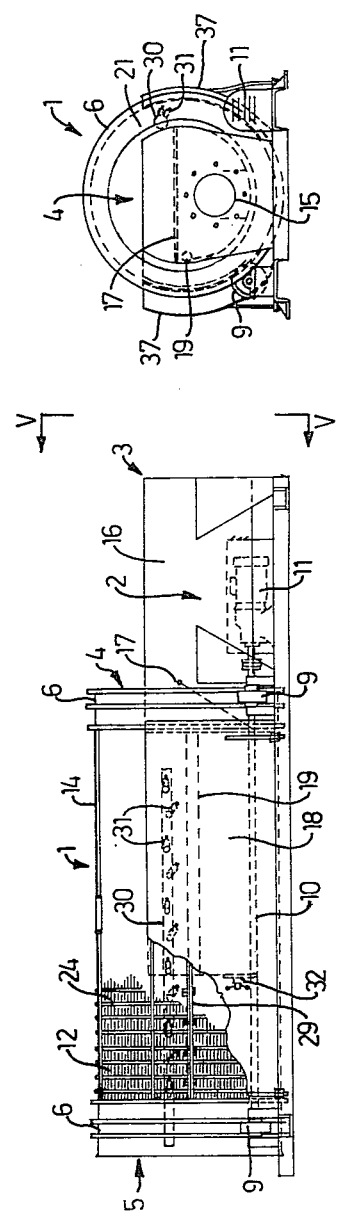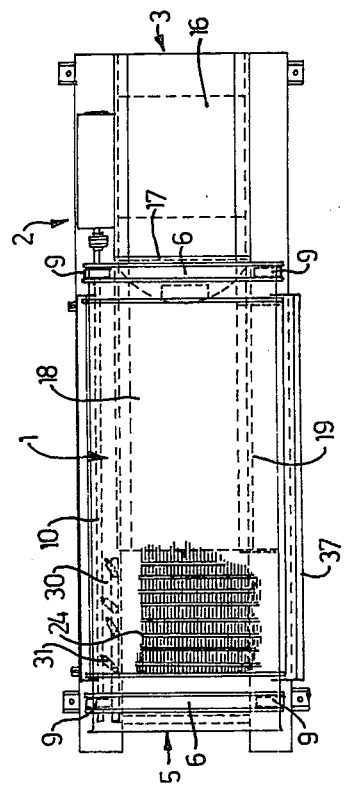

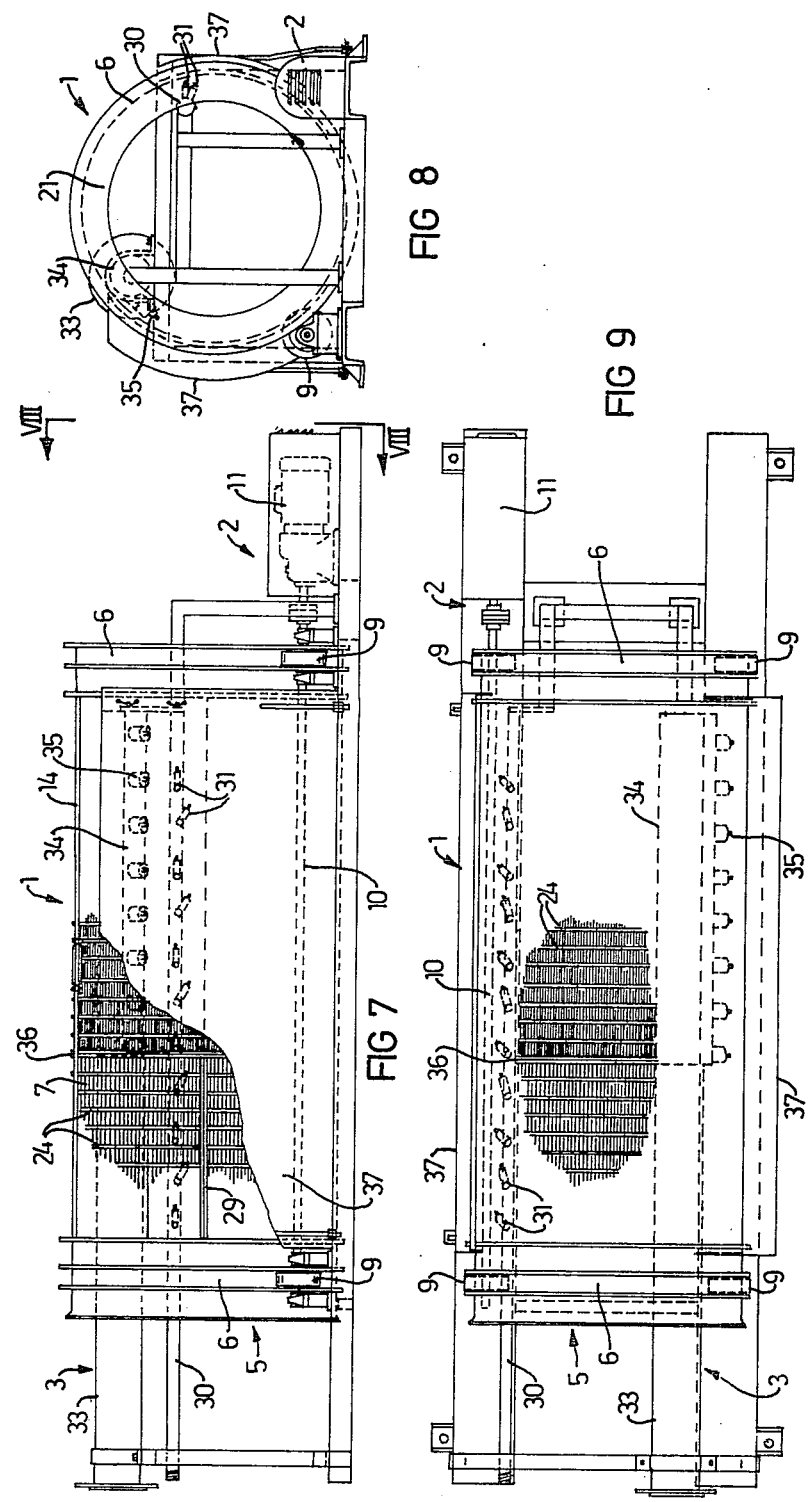

SEPARATION OF SOLIDS FROM LIQUIDS BY SCREENING

This is a continuation of application Ser. No. 833,466 filed September 12, 1977 and now abandoned.

BACKGROUND OF THE INVENTION

This invention is concerned with improvements in or relating to the separation of solids from liquids by screening. Often it is desired to separate one or more solids from one or more liquids where beforehand each solid existed in suspension in each liquid. The purposes of the separation are the recovery of either the solids or the liquids or both for further processing or for the release of one or the other into the environment. In this specification the term 'suspension' will be used with reference to the admixture of one or more solids and one or more liquids prior to screening and the terms 'solids' and 'liquid' will be used with reference to the products of the screening process, though it is realized that some liquid remains with the solids and some solids, or a sufficiently small particle size, remain in suspension in the liquid after screening.

Many types of apparatus and methods have been used for separating solids from liquids by screening. Static screens have often been used, the suspension flowing over a weir and down one or more inclined screens under the influence of gravity. The solids move down the screen to be collected at the bottom while the liquid drains through to be collected or discharged below the screen. However, static screens, while allowing continuous screening, handle only relative low flow rates and thus a large screening area is required to handle large flow rates. Furthermore, since the screens must slope downwardly, and because a relatively long length of screen is required for effective separation, the head of suspension required at the top of the screen is relatively large.

Rotary screens comprising a hollow rotatable drum having a perforated screening wall and having means for the delivery of the suspension to the interior of the drum are an improvement for by their rotation they continually present fresh screening surface to the suspension, this allowing larger flow rates to be handled than with static screens and they can be operated with a lower head of suspension than can equivalent static screens. One such rotary screen is described in U.S. Pat. No. 2,661,201. In this case, the wall of the drum has a plurality of relatively large circular perforations. This type of screen is suitable where the solids are in the form of relatively large particles but is not satisfactory for handling solids in the form of fine particles or fibres or globules, for the solids, depending on their size and composition, can either pass through the perforations with the liquid or clog the perforations. U.S. Pat. No. 3,961,605 discloses a rotary screen where the wall of the drum is made of a wedge shaped wire wound helically about support rods. The use of wedge wire reduces clogging but the screening efficiency is impaired by having, on rotation of the screen, the major component of the movement of the suspension relative to the screen substantially parallel to the coils of the screen wire. It has been found that screening efficiency, where screen wire is used, is improved by having the major component of the movement of the suspension in a direction substantially normal to the screen wire to produce a shearing effect. It was with this particular effect and the aforementioned disadvantages in mind that the present invention was devised.

The apparatus of the invention has applications in the screening of solids from waste waters and sewage liquors and in the thickening of slurries and pulses for example, amongst many another applications in industries such as freezing works, tanneries, pulp and paper mills, canneries, fish and meat processing and sewage treatment works.

SUMMARY OF THE INVENTION

Accordingly the present invention broadly consists in an apparatus for the separation of solids and liquids from a suspension by screening; said apparatus comprising a screening drum having a screening wall and a hollow interior, the drum being mounted to be rotatable about its axis when lying in a substantially horizontal plane; driving means to rotate the drum; inlet means to introduce a flow of the suspension into the interior of the drum and to direct the flow of suspension against an inner surface of the screening wall of the drum; and extracting means to extract solids from within the drum; said drum screening wall having a plurality of screening wires spaced apart in a parallel arrangement about the periphery of the drum, lying substantially axially along the drum.

More particularly the present invention consists in an apparatus for the separation of solids and liquids from a suspension by screening; said apparatus comprising a screening drum having a hollow interior; the drum being mounted to be rotatable about its axis which lies in a substantially horizontal plane; driving means to rotate the drum; inlet means to introduce a flow of the suspension into the interior of the drum and to direct this flow against an inner surface of the wall of the drum at an angle less than right angles; and extracting means to extract solids from within the drum, the extracting means comprising a plurality of diverter blades attached to the inner surface of the drum and angled to deflect separated solids towards an outlet end of the drum on rotation of the drum in one direction, this rotation opposing the direction of the flow of suspension striking the inner surface of the drum; said drum wall being formed as a screen by having a plurality of screening wires, which are wedge shaped in cross section, spaced apart in a parallel arrangement about the periphery of the drum, these wires each lying substantially axially along the drum and being arranged with a broad face facing the interior of the drum, that is, with the wedge being directed radially outwardly from the drum.

In a further aspect the present invention consists in a method for the separation of solids and liquids from a suspension by screening using the apparatus as defined above, said method comprising the steps of rotating the drum, introducing a flow of suspension into the drum, directing the flow at an angle less than right angles against the inner surface of the drum and in a direction opposing the rotation of the drum.

BRIEF DESCRIPTION OF THE DRAWINGS

Three preferred forms of the present invention will now be described with reference to the accompanying drawings in which:

FIG. 4 shows a side elevation of a modified form of the apparatus including spray washing means, FIG. 5 is an end elevation of V—V of FIG. 4.

FIG. 6 is a plan view of the apparatus shown in FIGS. 4 and 5,

FIG. 7 shows a side elevation of a further modified form of the apparatus having means for pressure feeding of the suspension onto the drum wall, FIG. 8 is an end elevation on VIII—VIII of FIG. 7, FIG. 9 is a plan view of the apparatus shown in FIGS. 7 and 8.

DETAILED DESCRIPTION OF THE PREFERRED EMBODIMENTS

Figure 1:
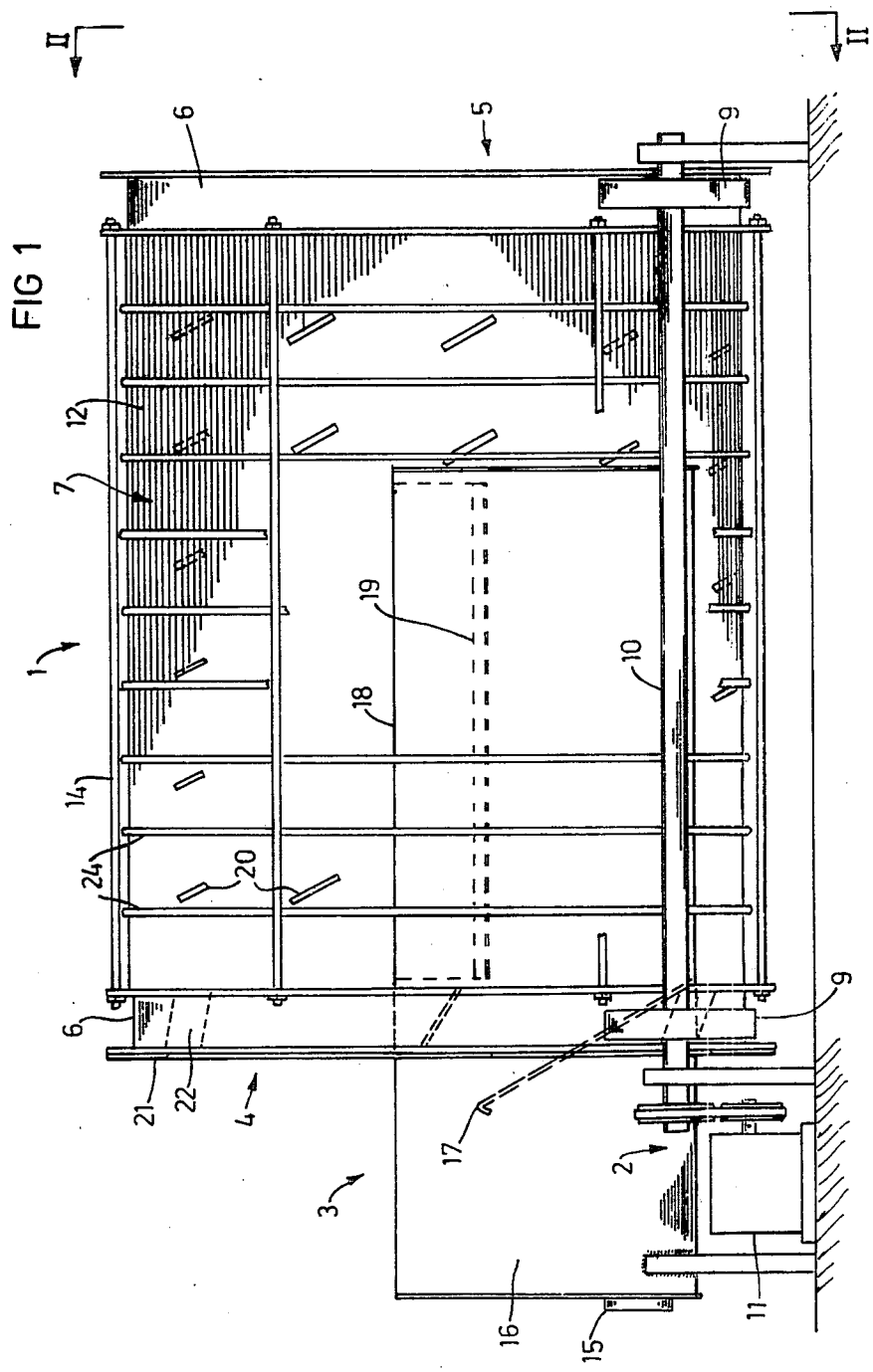
FIG. 1 shows a side elevation of a first preferred apparatus, with a section of the drum wall removed to show details of the inlet means.
Figure 2:
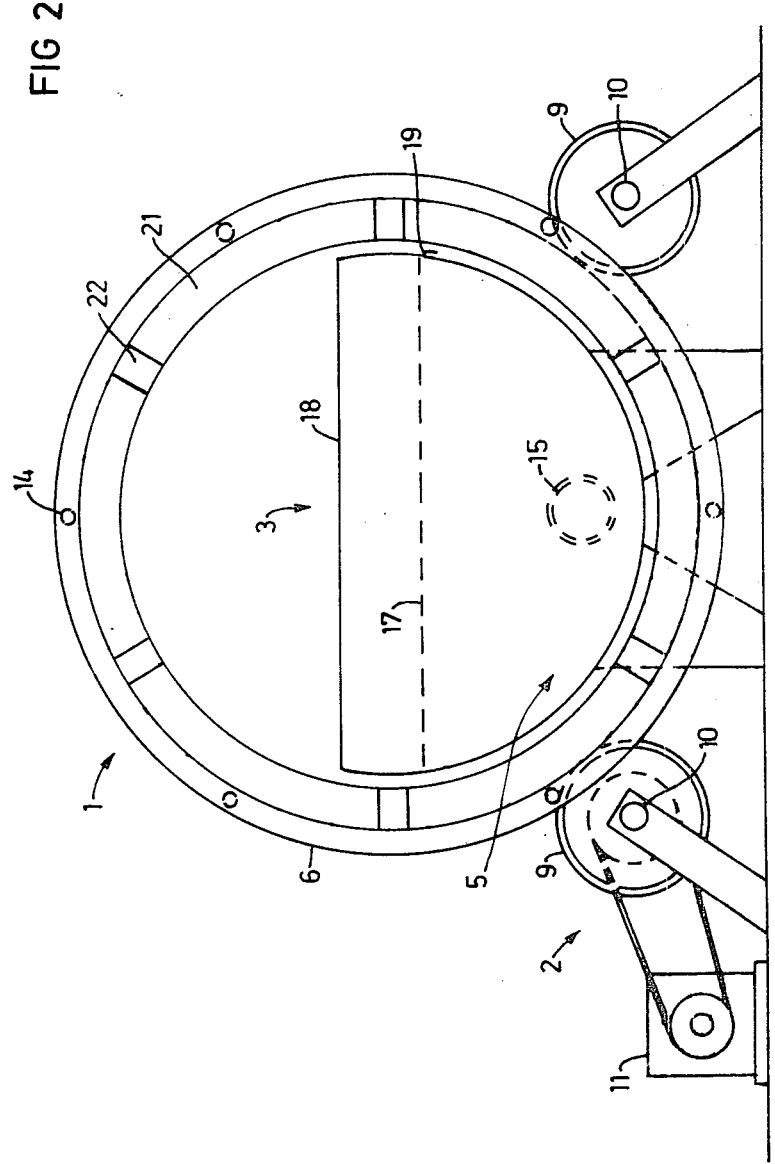
FIG. 2 is an end elevation of II—II of FIG. 1 showing the outlet end of the apparatus.

According to the present invention, an apparatus is provided for the separation of solids and liquids from a suspension by screening. The apparatus comprises a hollow screening drum 1 which is rotatably mounted about its axis which lies substantially in a horizontal plane, drive means 2 to rotate the screening drum, inlet means 3 to introduce a flow of a solid/liquid suspension into the interior of the drum and to direct the flow against an inner surface of the wall 7 of the drum, and extracting means to remove solids from within the drum through an end of the drum.

In particular, the preferred form of the apparatus has a hollow cylindrical drum 1 which is open at each end, one end being the inlet end 4 through which the suspension is introduced to the interior of the drum, and the other end being the outlet end 5 from which the separated solids are removed from within the drum. The screening drum is mounted for rotation about a substantially horizontal axis and with both ends of the drum being open this is best achieved by mounting the drum on trunnions or rollers. About the periphery or rim at each end of the drum there is a circular channel shaped tire 6 and the trunnion wheels nine lit into and run in the channels of the tires. The two trunnion wheels at each side of the drum are preferably mounted on a common shaft 10 and one of these shafts, and therefore the associated trunnion wheels, is driven from an electric motor 11 through a speed reduction system though the idler trunnions could be independently mounted. However, other drive means can be used, for example a water wheel such as a Pelton wheel could be used.

Figure 3:
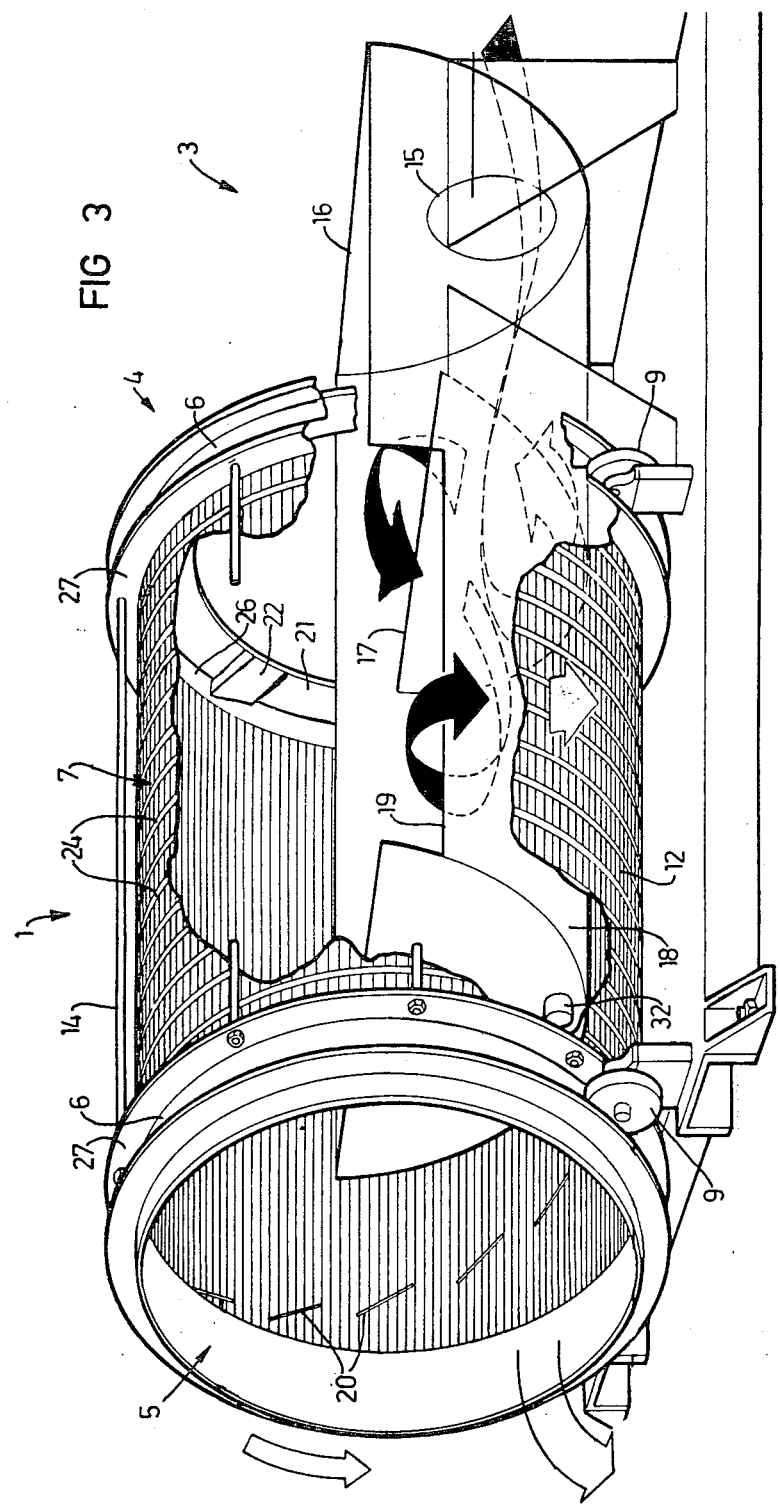
FIG. 3 is a perspective view of the apparatus with a section of the drum wall removed to show the inlet means and showing the flow pattern followed by the suspension and the screened solids and liquid.
Figure 10:
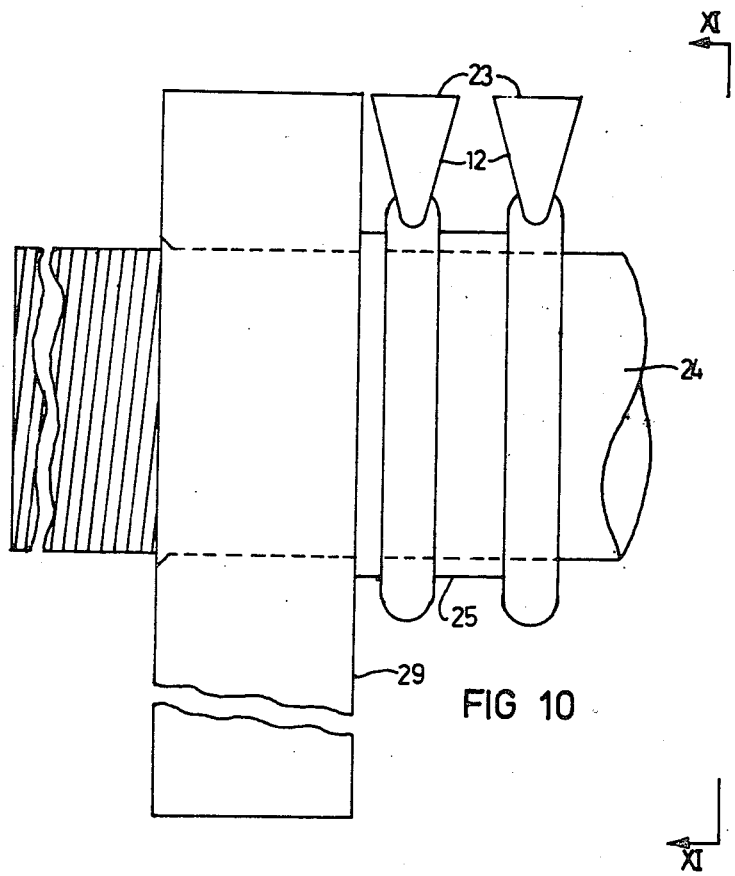
FIG. 10 shows, on an enlarged scale, details of the formation of the screen for forming the drum wall.
Figure 11:
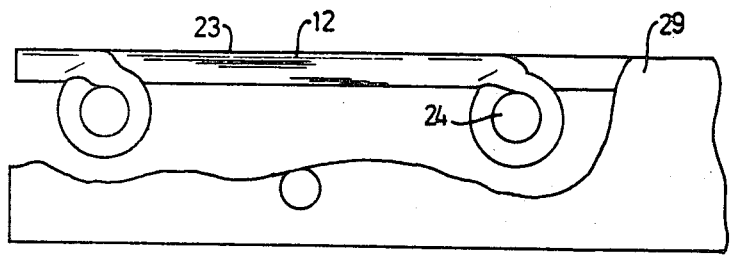
FIG. 11 shows on a smaller scale a view on XI—XI of FIG. 10.

The wall 7 of the drum is formed as a screen by having a plurality of screening wires 12 spaced apart in a parallel arrangement about the periphery of the drum, the wires lying substantially axially along the drum, the spaces between the wires allowing for the drainage of liquid from the screening drum in use. The preferred screening wire used is a wedge wire such as shown in FIGS. 10 and 11. As its name suggests, the wedge wire has a wedge shaped cross-section and in the screen the wedge wire is arranged to have a broad face 23 facing the interior of the drum, that is, with the wedge being directed radially outwardly from the drum. This arrangement reduces clogging of the screen in use. In the usual formation of a wedge wire screen each length of wire is looped about a number of spaced across rods 24 and spacers 25 are located on the cross rods between adjacent lengths of wedge wire to correctly space the wedge wires relative to each other. As shown in FIGS. 1 and 3 these cross rods 24 pass about the periphery of the screen. At each of its sides, at the ends of the drum, the screen is suitably attached to or mounted on inwardly projecting circular flanges 26 (see FIG. 3) attached to the tires 6 and the whole drum assembly is held together by means of tie rods 14 connecting the inner flanges 27 of the tires. In a preferred arrangement as shown in FIG. 4 the screen is formed from three similarly shaped curved screen sections which when joined together in the assembly form the complete screen. This allows any one of the screen sections to be replaced or to be reversed in position. As shown in FIGS. 10 and 11 the ends of the cross rods of a screen section are attached to side bars 29. Adjacent sides bars 29 of two screen sections can be bolted together as shown in FIG. 4 or the end of the side bars can be attached to the inwardly projecting flanges 26 attached to the tires, for example, as shown in FIG. 7.

The suspension to be screened is introduced through the inlet end of the drum. In the preferred arrangement illustrated in FIGS. 1-3 and 4—6 the suspension is delivered by a pipe 15 to a surge tank 16 the purpose of which is to reduce turbulence. From the surge tank the suspension flows over a first weir 17 to a semi-circular reservoir 18 which extends into the screening drum for about two thirds of the drum length and from the reservoir the suspension flows over a second weir 19. The second weir is positioned adjacent the inner surface of the drum to a side of the drum and the suspension flowing over the weir and falling downwardly strikes the inner surface of the screen wall of the drum just below the mid-height of the drum at an angle less than right angles and preferably substantially tangentially to the screen surface. This produces a shearing action on the suspension by the wedge wire which is beneficial in providing an effective separation of the solids from the liquid which drains out through the space between the wedge wires leaving most of the solids within the drum. The solids tend to move down towards the bottom of the drum under both the influence of gravity and the washing effect of fresh suspension flowing over the weir 19 onto the screen. If the drum is held stationary this provides, in effect, a short length of static screen and the solids tend to build up from the bottom of the drum towards the weir and clog the screen wire. For this reason the drum, in use, is continuously rotated in a direction opposing the flow of the suspension falling from the second weir 19. This contra-rotation of the drum and hence the screen improves the shearing action of the suspension by the wedge wires forming the screen and is significant in improving the efficiency of the apparatus. Furthermore, with this direction of rotation of the drum the solids are continually being tumbled and washed down towards the bottom of the drum rather than perhaps being carried up the other side of the drum to fall back into the reservoir with rotation of the drum with the flow of the suspension. The rate of rotation of the drum is such that its peripheral speed is approximately 24–45 meters/minute.

The apparatus is provided with extracting means for extracting the solids from the drum through the outlet end 5. The solids are extracted continuously so that 'fresh' screen is always being presented to the flow of suspension from the second weir. In the preferred form of the invention diverter blades 20 are attached to the inside surface of the screen to lie at an angle of about 45°–70° with respect to the wedge wires, the trailing ends of the diverter blades being closer to the outlet end of the drum. The diverter blades are short in length (perhaps 10–30 cm in length) and are relatively shallow in depth and width so as not to impede the shearing action of the screen on the suspension flowing over the second weir. The trailing end of one blade is preferably aligned with or overlaps the leading end of the next blade and so on as shown in FIG. 3. With the diverters the solids being tumbled or washed down the screen are gradually deflected towards the outlet end of the drum where they can be collected. At the inlet end of the drum there is an inwardly directed annular ring or dam 21 to which the dam diverter blades 22 are attached, these being arranged at an angle of about 30° to 45° with respect to the dam. These dam diverters initiate movement of the flow away from the inlet end and towards the outlet end of the drum. As an alternative to separate diverter blades a continuous helical rib or ribs could be attached about the inside surface of the drum though this arrangement is not preferred for the shearing action is impeded in this case, the movement of the suspension being given a greater lengthwise component than if separate and spaced diverter blades are used.

The above describes a preferred form of the invention and indicates the method by which the apparatus is used for effective screening of suspensions of solids in liquids. However, various modifications can be made to the apparatus and method without departing from the scope of the invention and some of these modifications have been indicated in the preceding description. As an example of modifications to the invention screening wires other than those having a wedge shape can be used, for example, wires having a circular cross-section. However, these are not preferred as they do not provide the same shearing action between the suspension and the screen and the efficiency and effectiveness of the apparatus is reduced. Furthermore, although the expression 'wire' has been used, screen wires can be made of materials other than steel, for example suitable plastics materials. In another form of the invention the drum may have only one open end, this serving as both the inlet and outlet end for the drum. The opposite end of the drum can then be closed or arranged to be supported on a central shaft about which the drum is rotatable, this doing away with the need for the trunnion wheels at, at least, this end of the drum.

The drum may be built to have any suitable dimensions depending on the particular application and the requirements of that application. For example, the drum could have a diameter of 60 cm and be approximately 45 cm in length or could be 300 cm in diameter and perhaps 600 cm in length. Wedge wire suitable for use with the preferred form of the invention may have a width of about 2.5 mm across the broad face of the wedge wire which faces inwardly on the drum and the gap separating adjacent wedge wires may be in the order of 0.5 to 3.0 mm. However other dimensions can of course be used. The components of the apparatus are preferably made from a stainless steel and the apparatus mounted on a mild steel base plate of a heavy cross section which is blasted and epoxy coated.

In a modification of the invention, as illustrated in FIGS. 4–6, the apparatus is provided with spraying means to spray a liquid, usually water, onto the inner surface of the drum to dislodge solids caught by the screening wires. The spraying means has a pipe passing into the drum from the outlet end on the side of the apparatus opposite the location of the second weir and from this pipe a plurality of nozzles 31 are directed towards the inner surface of the wall of the drum. Some of the nozzles are preferably directed downwardly slightly and all are preferably angled towards the inlet end of the apparatus. This improves the washing of the screen wires with minimal washing liquid discharge with the solids. In FIG. 4, the reservoir 18 is shown having a drain door 32 which is removable for drainage of the tank and for cleaning purposes.

A further modification of the invention is shown in FIGS. 7—9, this modification relating particularly to the inlet means of the apparatus. In this form of the invention the inlet means comprises an inlet pipe passing into the interior of the screening drum from the outlet end and leading to an inlet manifold 34 within the drum. The inlet manifold has a plurality of openings or nozzles 35 from which the suspension is directed at pressure against the inner surface of the wall along about two thirds the length of the drum from the inlet ends. The manifold nozzles are angled downwardly so that the suspension delivered from these strikes the inner surface of the screen wall substantially independently tangentially, as is preferred. The pressure feeding allows a greater rate of discharge of the suspension from the inlet means but can tend to force solids through the screen wire. In this case it is preferable that the length of the drum over which the suspension is directed from the inlet manifold has a finer screen wire gap than the remaining third of the length of the drum which functions mainly as a drainage section. The change in the screen wire gap is indicated by the numeral 36 in FIGS. 7 and 9. In this form of the invention the spraying system can again be used and in both this and in other forms of the invention splash guards 37 can be provided either side of the screening drum.

The screening apparatus of this invention can for its size and cost handle much larger flowrates of suspensions than can equivalent static screens and furthermore only a relatively small head of suspension is required to enable the screening apparatus to be used.

We claim:

1. An apparatus for the separation of solids and liquids from a suspension by screening, said apparatus comprising:
   a screening drum having a hollow interior and a screening wall which has a plurality of screening wires spaced apart in a parallel arrangement about the periphery of the drum and lying subtantially axially along the drum;
   mounting means whereby said drum is mounted to be rotatable in one direction about its axis which lies in a substantially horizontal direction plane;
   driving means to rotate the drum; and
   inlet means to introduce a flow of the suspension into the interior of the drum and to direct substantially all of this flow against an inner surface of the wall of the drum so that the flow of the suspension where it strikes the drum wall is in a direction opposing the direction of movement of the wall of the drum as caused by said rotation of the drum.

2. An apparatus as claimed in claim 1 wherein the screening wires are wedge wires, being wedge shaped in cross section, and in the wall of the drum are each arranged with a broad face facing the interior of the drum, that is, with the wedge being directed radially outwardly from the drum.

3. An apparatus as claimed in claim 2 wherein the wall of the drum is made up of a plurality of separable screen sections.

4. An apparatus as claimed in claim 1 wherein the inlet means directs the flow of suspension substantially tangentially against the inner surface of the wall of the drum, the drum being rotatable so that that part of the wall onto which the suspension is directed moves in an opposing direction to this flow.

5. An apparatus as claimed in claim 4 wherein the inlet means includes a reservoir within the drum into which the suspension is delivered, the reservoir having a weir over which the suspension flows to fall onto the inner surface of the wall.

6. An apparatus as claimed in claim 5 wherein the inlet means includes a surge tank into which the suspension is delivered, the surge tank having a weir over which the suspension flows into said reservoir.

7. An apparatus as claimed in claim 1 wherein the inlet means comprises an inlet manifold extending into the interior of the drum and having a plurality of openings from which the suspension is directed against the inner surface of the wall.

8. An apparatus as claimed in claim 7 wherein the suspension enters the manifold and is delivered from the manifold under a pressure greater than that outside the manifold.

9. An apparatus as claimed in claim 1 wherein the drum is open at its ends, one end providing an inlet end through which the suspension is delivered to the interior of the drum and the other end being an outlet end from which solids separated from the suspension are removed from the interior of the drum.

10. An apparatus as claimed in claim 1 wherein the apparatus includes extracting means to extract solids from within the drum.

11. An apparatus as claimed in claim 10 wherein the extracting means comprises a plurality of diverter blades attached to the inner surface of the drum, said diverter blades being arranged at an angle to deflect the separated solids towards the outlet end of the drum on rotation of the drum in one direction.

12. An apparatus as claimed in claim 11 wherein the extracting means includes an annular ring or dam attached to the periphery of the drum at the inlet end and a plurality of blades attached directly to the dam, these blades being angled to deflect suspension towards the outlet end of the drum on rotation of the drum in said one direction.

13. An apparatus as claimed in claim 11 wherein the extracting means includes spraying means to spray a liquid onto the inner surface of the drum to dislodge solids caught by the screening wires.

14. An apparatus as claimed in claim 1 wherein the drum has a circular tyre about the periphery of the drum at each end and the tyres of the drum are mounted on parallel pairs of rollers, at least one of which is driven in use to provide said driving means to rotate the drum.

15. Apparatus for the separation of solids and liquids from a suspension by screening, said apparatus comprising;
a screening drum having a hollow interior and a screening wall which has a plurality of screening wires spaced apart in a parallel arrangement about the periphery of the drum and lying substantially axially along the drum, said wires being wedge shaped in cross section and being arranged in the drum wall with a broad face facing the interior of the drum, that is, with the wedge being directed radially outwardly from the drum;
mounting means whereby said drum is mounted to be rotatable in one direction about its axis which lies in a substantially horizontal plane;
driving means to rotate the drum;
inlet means to introduce a flow of the suspension into the interior of the drum and to direct substantially all of this flow against an inner surface of the wall of the drum so that the flow of the suspension where it strikes the drum wall is in a direction opposing the direction of movement of the wall of the drum as caused by said rotation of the drum; and
extracting means to extract solids from within the drum, the extracting means comprising a plurality of diverter blades attached to the inner surface of the drum and angled to deflect separated solids towards an outlet end of the drum on rotation of the drum in said one direction.

16. The apparatus of claim 15 in which the inlet means is a resevoir which extends into the screening drum for about two thirds of the drum length.

17. Apparatus for the separation of solids and liquids from a suspension by screening, said apparatus comprising:
(a) a substantially horizontal screen drum having a hollow interior and open ends, the side walls of said drum comprising a plurality of elongated members in parallel arrangement and spaced apart about the periphery of the drum and lying substantially parallel to the axis of rotation thereof;
(b) means to drive said drum in a single direction of rotation; and
(c) means to introduce a flow of suspension materials along a substantial portion of the axial length of the interior of the drum and to direct substantially all of said flow countercurrent to the direction of rotation of the drum, so as to cause a shearing action by the elongated members against the incoming suspension.

18. The apparatus of claim 17 in which the elongated members are wedge shaped in cross section and are positioned so that the wedge points radially outwardly.

19. The apparatus of claim 17 in which the inlet means is an elongated reservoir having two sidewalls, one sidewall being lower than the other to form a weir over which the suspension flows countercurrent to and against the direction of rotation of the rotating screen drum.

20. An apparatus as claimed in claim 17 wherein the apparatus includes extracting means to extract solids from within the drum after separation from the suspension.

21. A method for the separation of solids and liquids from a suspension by screening, said method comprising the steps of:
rotating a screening drum in one direction about its axis which lies in a substantially horizontal plane, said drum having a hollow interior and a screening wall which has a plurality of screening wires spaced apart in a parallel arrangement about the periphery of the drum and lying substantially axially along the drum;
introducing a flow of suspension into the drum;
directing substantially all of the flow against an inner surface of the drum in a direction opposing the direction of movement of the wall of the drum as caused by said rotation of the drum; and extracting screened solids from within the drum.

22. A method as claimed in claim 21 wherein the flow of suspension strikes the inner surface of the drum wall substantially tangentially.

23. A method as claimed in claim 21 wherein the flow is directed by an inlet manifold extending into the interior of the drum which has a plurality of openings to permit the suspension to be directed against the inner surface of the wall.

24. A method as claimed in claim 23 wherein the introduction of the flow suspension into the manifold is delivered under a pressure greater than that outside of the manifold.

25. A method as claimed in claim 21 wherein said extracting is performed by a plurality of diverter blades attached to the inner surface of the drum with the blades being arranged at an angle to deflect the separated solids towards the outlet end of the drum as the drum rotates in its one direction.

26. A method as claimed in claim 25 wherein said extracting further comprises spraying a liquid onto the inner surface of the drum to dislodge solids caught by the screening wires.

27. Apparatus for the separation of solids and liquids from a suspension by screening, said apparatus comprising:
   (a) a substantially horizontal screen drum having a hollow interior and open ends, the side walls of said drum comprising a plurality of elongated members in parallel arrangement and spaced apart about the periphery of the drum and lying substantially parallel to the axis of rotation thereof;
   (b) means to drive said drum in a single direction of rotation; and
   (c) means to introduce a flow of suspension materials by gravity along a substantial portion of the axial length of the interior of the drum and to direct substantially all of said flow countercurrent to the direction of rotation of the drum, so as to cause a shearing action by the elongated members against the incoming suspension.

28. The apparatus of claim 27 in which the elongated members are wedge shaped in cross section and are positioned so that the wedge points radially outwardly.

29. The apparatus of claim 27 in which the inlet means is an elongated resevoir having two sidewalls, one sidewall being lower than the other to form a weir over which the suspension flows countercurrent to and against the direction of rotation of the rotating screen drum.

* * * * *